HYDROGEN FIRE BLINK DETECTOR

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

This invention relates to a fire detection device and particularly to a device for detection of hydrogen fires.

2. Description of the Prior Art

The properties of hydrogen fires and explosions have become increasingly important with the use of liquid hydrogen as a rocket engine propellant. In the past a number of hydrogen fire detection systems based on the radiation emitted from the fire have been developed. Hydrogen fires radiate almost exclusively in the infrared and ultraviolet portions of the spectrum with essentially no radiation in the visible spectrum. Early investigations and detection systems were primarily concerned with the detection of infrared radiation from such fires and used the temperature rise of a thermal detector to produce an electrical signal. Other infrared detectors were of the lead sulfide or photocell types.

Still other detectors use a Geiger-Mueller tube which counts gamma rays but can be modified to detect ultraviolet radiation from hydrogen fires.

Most of these prior art hydrogen fire detectors have one thing in common; they have an electrical output which terminates in a visible or audible alarm. However, a requirement has also arisen for a hydrogen fire detector which can operate in conjunction with a closed-circuit television monitor to produce a video output. This appears difficult because of the fact that hydrogen fires are invisible unless (1) the hydrogen contains impurities or (2) certain atmospheric conditions exist. Although spectral energy is given off in the infrared spectrum (wavelengths greater than 7,000 angstroms), conventional television systems are not sensitive enough to infrared light to display hydrogen fires. Therefore, a small fire could go undetected on a television monitor until catastrophic damage was done.

SUMMARY OF THE INVENTION

Accordingly, it is an object of this invention to develop a hydrogen fire detector which incorporates a television monitor and has a video output.

It is a further object of the invention to develop a hydrogen fire detector which can discriminate against both solar radiation and rocket engine plume radiation and produces a video output, making it possible to view a hydrogen fire, even on a rocket in flight, at a remote location either in space or on ground.

These and other objects are accomplished in the present invention which converts the infrared emanation from a hydrogen fire to a visual display. The device combines a blink detector comprising an infrared filter and an infrared image converter with a conventional vidicon camera and television receiver-monitor.

BRIEF DESCRIPTION OF THE DRAWING

The FIGURE is an exploded perspective diagram of the invention.

DESCRIPTION OF THE PREFERRED EMBODIMENT

Figure 1:
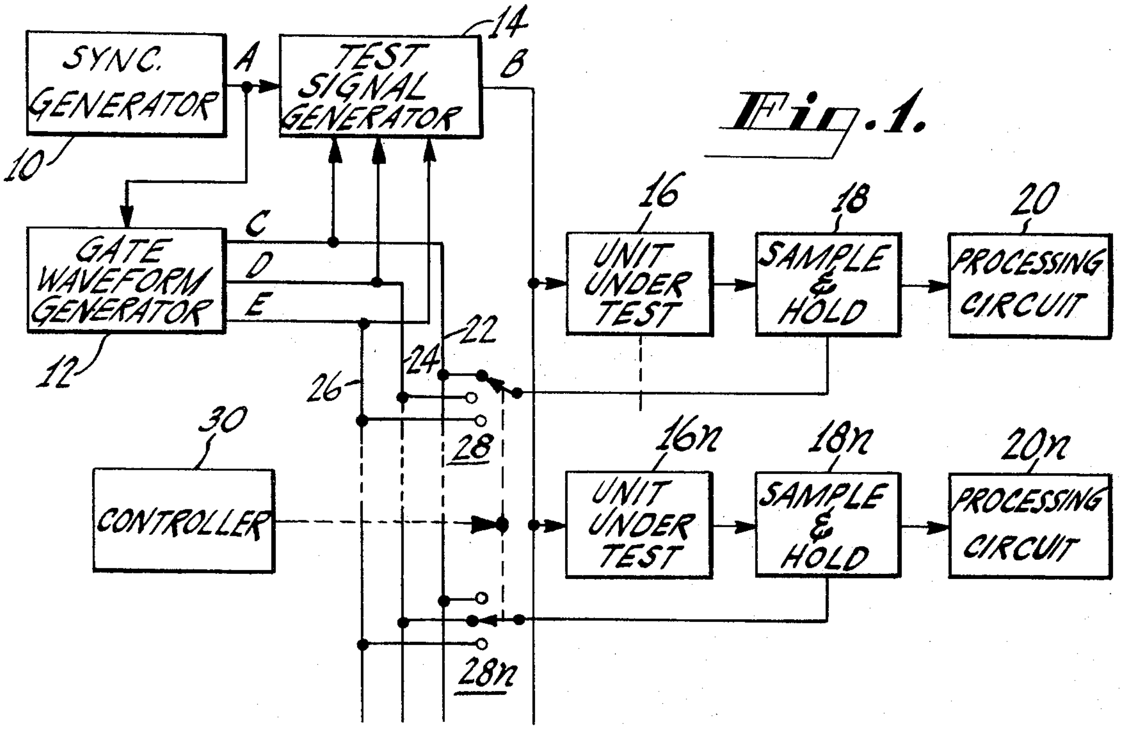
Figure 3:
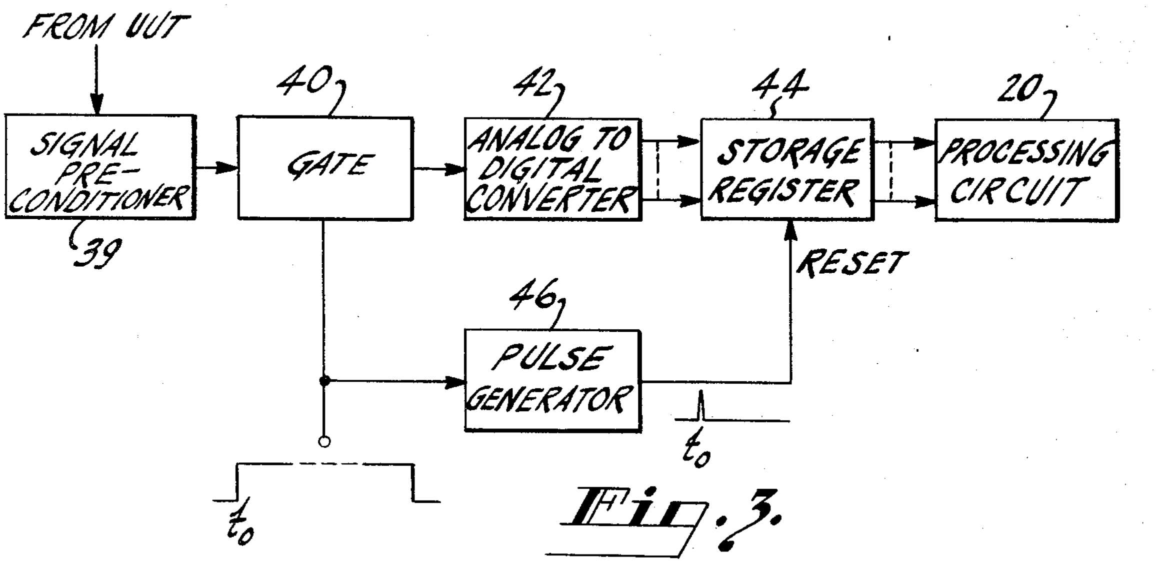
Figure 2:
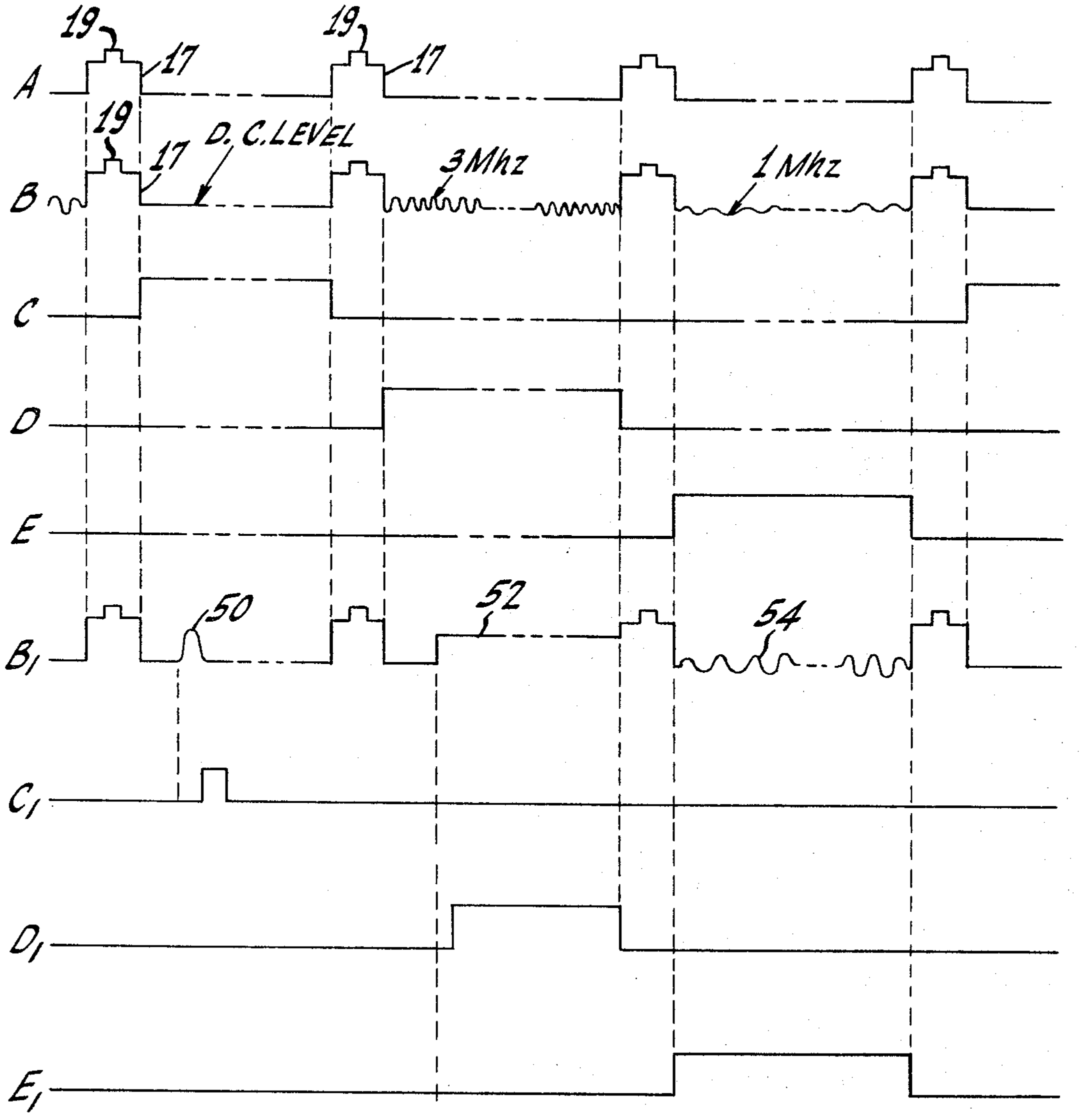

With continued reference to the accompanying FIG. 1, reference numeral 10 generally designates an illustrative embodiment of the device used to detect fires, particularly hydrogen fires, on a high altitude rocket or on the ground.

A hydrogen fire is represented symbolically by a burning candle 11. The blink detector 12 comprises a lens system 14, filter 16 and infrared image converter tube 18. The image output from tube 18 is read by vidicon camera 20 with video presentation on television receiver-monitor 22.

Lens system 14 comprises a set of conventional glass lenses 24 and 26. Filter 16 comprises a small filter wheel 28 about 2 inches in diameter having a red filter section 30 and a blue filter section 32. Wheel 28 is driven by a small electric motor 34.

Image converter tube 18 comprises a photo cathode (light sensitive screen) 36 (at the end nearest filter 16), a plurality of accelerating electrodes 38 connected to a high voltage power supply 40, and a phosphor anode imaging screen 42 (at the opposite end of tube 18).

Vidicon camera 20 comprises lens system 44 having conventional glass lenses 46 and 48 and vidicon tube 50. Cable 52 connects camera 20 to television receiver-monitor 22. Cable 52 may, of course, be replaced by a radio link in a manner known to those skilled in the art.

One cycle of operation of the hydrogen fire blink detector is as follows: light rays from simulated hydrogen fire 11 pass through a lens system 14, filter wheel 28 and image converter tube 18. Television camera (vidicon) 20 picks up the blinking image of the fire and passes it by way of cable 52 to television receiver-monitor 22 where it may be seen.

By the inclusion of the infrared image converter 18 between the camera 20 and lens system 14, the infrared light is sensed and displayed. The infrared image 37 of the source of infrared energy (hydrogen fire represented by candle 11) is focused on the photon-sensitive cathode 36 of the image converter tube 18. In the image converter 18, the high efficiency photo cathode 36 converts the infrared image 37 into a focused cloud of electrons which is linearly accelerated and impinges on the phosphor screen anode 42, providing a visible light output with an overall photon gain. This visible output takes the form of visible image 43 on anode 42. Visible image 43 is also focused on the television camera tube 50 as visible image 45. The image 45 is processed in the conventional manner for closed circuit television systems and finally displayed on the television monitor 22.

An observer watching the television monitor 22 over a long period of time usually will not detect slight changes in display content. However, in the present invention, the filter wheel 28 consisting of red and blue filters 30 and 32 is rotated between the image converter 18 and the front optics comprising lenses 24 and 26. Thus a blinking image of the infrared light emitting source 11 is displayed. This blink feature permits the observation of low level changes in infrared energy by enforcing the persistence charactersitic of the eye. The red filter 30 passes the infrared light while the blue filter 32 blocks infrared light. The result is an alternately light and dark image of the infrared source, which enables the device to distinguish a diffuse hydrogen fire from a rocket engine plume. The outline of the fire enables the device to distinguish against sunlight.

Visible light from the area scanned by the television camera is displayed unaltered because the spectral response of the image converter extends into the visible light region and passes colors that the television camera can see.

The foregoing discussion described a hydrogen fire detection system which will detect diffuse hydrogen fires in the presence of sunlight and oxygen-hydrogen engine exhaust plume radiation, using components which are relatively inexpensive. By combining the infrared image converter and rotary filter wheel into an ordinary closed-circuit television system, hydrogen fires may be displayed at only a small additional cost.

It will be apparent to those skilled in the art that this invention may take a different form wherein the image converter tube is an integral part of the television camera tube, thereby consolidating the system. In this embodiment, the filter wheel system is preferably still included in the device as a separate subcombination ahead of the composite image converter tube and camera imaging tube, for intensification of the fire image so as to provide early warning in the manner already described above.

United States Patent [15] 3,659,044
Olson [45] Apr. 25, 1972

[54] TEST SYSTEM FOR ELECTRICAL APPARATUS

[72] Inventor: Larry Alan Olson, Indianapolis, Ind.

[73] Assignee: RCA Corporation

[22] Filed: July 31, 1970

[21] Appl. No.: 59,953

[52] U.S. Cl. ....................178/6.8, 178/DIG. 4, 179/175.21, 325/363, 328/188

[51] Int. Cl. ....................H04n 1/38, H04n 7/08

[58] Field of Search ....................178/DIG. 4, DIG. 3; 328/187, 328/188; 325/363; 324/73 R; 179/175.21

[56] References Cited

UNITED STATES PATENTS

| | | | |
|---|---|---|---|
| 3,529,079 | 9/1970 | Moskovitz et al. | 328/187 X |
| 3,420,952 | 1/1969 | Baun | 328/187 X |
| 3,502,975 | 3/1970 | Gowan et al. | 324/73 |
| 3,172,039 | 3/1965 | Bernstein | 178/DIG. 4 |
| 2,733,433 | 1/1956 | Morrison | 178/DIG. 4 |

*Primary Examiner*—Robert L. Griffin
*Assistant Examiner*—Richard K. Eckert, Jr.
*Attorney*—H. Christoffersen

[57] ABSTRACT

A test waveform which consists of *n* separate test signals during *n* successive time intervals, respectively, is applied to one or more units under test. The response of a unit to a particular one of the signals is ascertained by sensing the output produced by that unit only during times synchronous with times that the test signal is present.

7 Claims, 3 Drawing Figures

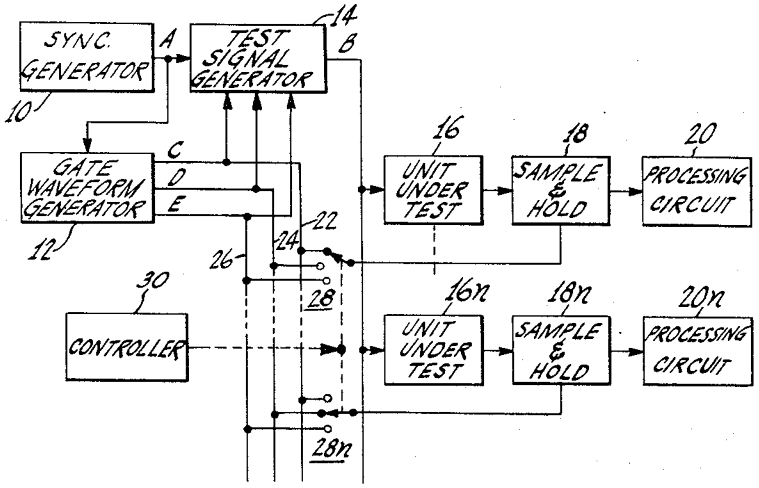

INVENTOR.
LARRY A. OLSON
BY [signature]
Attorney

INVENTOR.
LARRY A. OLSON
BY Samuel Ooke
Attorney